(12) United States Patent
Gress et al.

(10) Patent No.: US 10,549,600 B2
(45) Date of Patent: Feb. 4, 2020

(54) UNIVERSAL REFRIGERATION UNIT INSTALLATION BRACKET

(71) Applicant: Morgan Truck Body, LLC, Houston, TX (US)

(72) Inventors: David L. Gress, Palmyra, PA (US); Corby L. Stover, Honey Brook, PA (US); Matthew J. Kinneman, Downingtown, PA (US)

(73) Assignee: Morgan Truck Body, LLC, Morgantown, PA (US)

( * ) Notice: Subject to any disclaimer, the term of this patent is extended or adjusted under 35 U.S.C. 154(b) by 366 days.

(21) Appl. No.: 15/298,920

(22) Filed: Oct. 20, 2016

(65) Prior Publication Data

US 2017/0106720 A1   Apr. 20, 2017

Related U.S. Application Data

(60) Provisional application No. 62/244,077, filed on Oct. 20, 2015.

(51) Int. Cl.
*F25D 23/00* (2006.01)
*B60H 1/00* (2006.01)
*F25B 39/00* (2006.01)
*F25B 39/02* (2006.01)

(52) U.S. Cl.
CPC ..... *B60H 1/00535* (2013.01); *B60H 1/00328* (2013.01); *F25B 39/00* (2013.01); *F25D 23/006* (2013.01); *F25B 39/02* (2013.01)

(58) Field of Classification Search
CPC .......... B60H 1/00535; Y10T 29/49359; Y10T 29/49396
See application file for complete search history.

(56) References Cited

U.S. PATENT DOCUMENTS

| | | |
|---|---|---|
| 4,289,269 A | 9/1981 | Sciortino |
| 4,592,530 A | 6/1986 | Seely et al. |
| 4,648,169 A | 3/1987 | Seely et al. |
| 4,651,966 A | 3/1987 | Suzuki |
| 4,825,669 A | 5/1989 | Herrera |
| 4,936,599 A | 6/1990 | McNamee |
| 5,070,708 A * | 12/1991 | Malosh ................. F25D 23/006 62/295 |
| 5,209,449 A | 5/1993 | Hart |
| 5,303,895 A | 4/1994 | Hart |
| 5,454,542 A | 10/1995 | Hart |
| 5,658,177 A | 8/1997 | Wagner |
| 5,865,562 A | 2/1999 | Mallek |
| 6,131,867 A | 10/2000 | Mallek |
| 6,273,391 B1 | 8/2001 | Engolia |

(Continued)

OTHER PUBLICATIONS

Installation instructions for Thermo King ES300 Evaporator and ES500 Evaporator (9 pages).

(Continued)

*Primary Examiner* — Jason L Vaughan
*Assistant Examiner* — Amanda Kreiling
(74) *Attorney, Agent, or Firm* — John W. Montgomery

(57) ABSTRACT

A universal mounting bracket, mounting system and method for an evaporator unit of a refrigeration system in a truck body provides for mounting any one of a selected number of currently available evaporator units.

7 Claims, 14 Drawing Sheets

(56) References Cited

U.S. PATENT DOCUMENTS

| | | | |
|---|---|---|---|
| 6,363,736 B1 * | 4/2002 | Kunkel | F25D 21/14 |
| | | | 248/247 |
| 6,462,961 B1 | 10/2002 | Johnson et al. | |
| 6,497,087 B1 | 12/2002 | Stiefvater et al. | |
| 6,585,208 B1 | 7/2003 | Fraser | |
| 6,748,802 B1 | 6/2004 | Hendey | |
| 6,854,575 B1 | 2/2005 | Desormeaux et al. | |
| 7,040,592 B1 | 5/2006 | Thomas | |
| 7,434,950 B2 | 10/2008 | Whitney | |
| 7,849,614 B2 | 12/2010 | Belzile et al. | |
| 7,997,015 B2 | 8/2011 | Belzile et al. | |
| 8,403,289 B1 | 3/2013 | Rinderer | |
| 9,131,619 B2 | 9/2015 | Moore et al. | |

OTHER PUBLICATIONS

Installing S-2 or S-3 Evaporators (1 page).
Carrier Evaporator Mounting Preparation, Installation & Commissioning Manual: Carrier® 20X, 30S, 35X, 40X, 50X, 62-11165 Rev B (2 pages).

\* cited by examiner

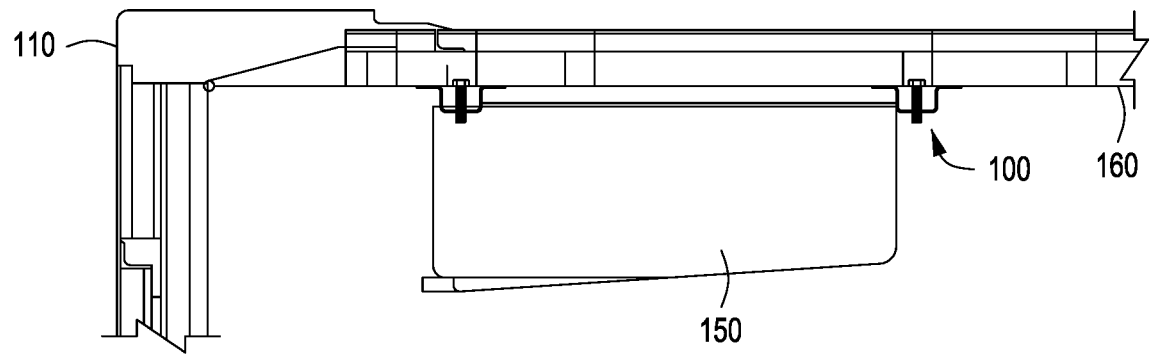
FIG. 10
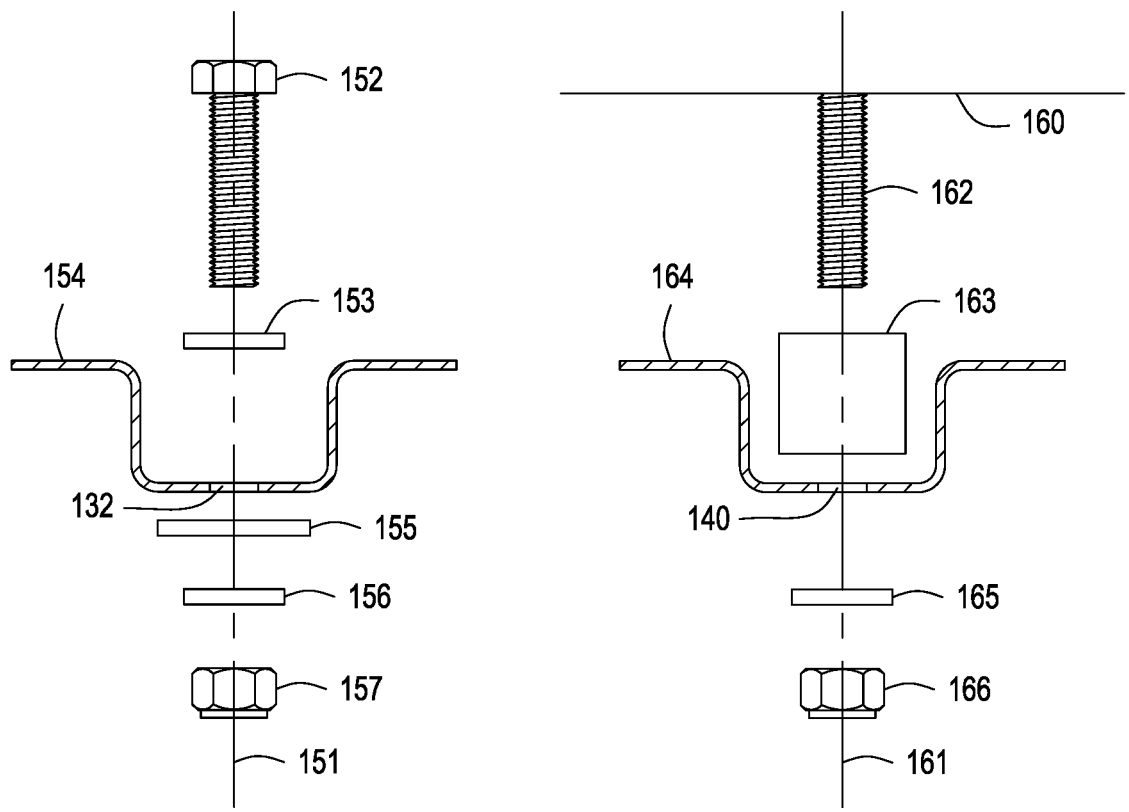
FIG. 11
FIG. 12

UNIVERSAL REFRIGERATION UNIT INSTALLATION BRACKET

RELATED APPLICATIONS

This is a Utility application related to U.S. provisional application Ser. No. 62/244,077 filed Oct. 20, 2015, from which the present application claims priority and that is incorporated herein by references for all legitimate purposes.

BACKGROUND

Field of Invention

The invention relates generally to a mounting bracket for an evaporator unit of a refrigeration system in a truck body.

Background Art

Currently, there are a variety of methods for mounting and in some cases mounting brackets used by truck body manufacturers, trailer manufacturers and service facilities when installing evaporator units (evaporators) as part of a refrigeration system. Regardless of which one of several possible current mounting brackets is chosen, each current bracket restricts the truck to a single type of refrigeration system and does not allow any flexibility for the vehicle's owner to change the refrigeration system at a later time (if needed) without incurring extensive and expensive rework of the mounting bracket and/or rework of the structural support for the mounting bracket of the truck body, such as roof reinforcements where the brackets or the evaporators are to be mounted. Additionally, miscommunication between the vehicle owner and the installer can lead to the installation of the wrong mourning bracket, roof reinforcements, or other structures for mounting even when the desired refrigeration system or evaporator unit is known in advance. This requires rework to correct the installation and to avoid premature failure of the installation.

SUMMARY OF INVENTION

In one or more embodiments, a universal mounting bracket, for an evaporator unit of a refrigeration system in a truck body, comprises a pair of spared-apart brace members. There is a set of bracket-to-truck body attachment devices, with the attachment devices located at predetermined attachment locations on the brace members, A plurality of cross members is rigidly secured between the brace members. A plurality of sets of evaporator connection devices are provided, wherein each set of the plurality of evaporator connection devices is formed at a plurality of locations on one or more of the brace members and cross members corresponding to each of a plurality of connection positions defined by different commercially-available refrigeration system evaporator units Other aspects and advantages of the invention will be apparent from the following description and the appended claims.

BRIEF DESCRIPTION OF DRAWINGS

FIGS. 6A, 68, 6C, and 6D are depictions of the particular dimensions for mounting different ones of several prior art evaporator units for the one or more of the several other commercially-available refrigeration systems as generally depicted in FIG. 5 and providing a portion of written installation instructions and steps for the method of installation of the prior art evaporator units for the one or more of the several commercially-available refrigeration systems as depicted in FIG. 7, in which existing mounting studs from a prior installation (if properly positioned) may be used or mounting holes are to be marked according the schematic depiction of mounting dimensions for either mounting evaporator units for model systems or for model BV systems.

FIGS, 7A, 713 and 7C are a schematic depictions of additional installation method steps for drilling through the roof of the truck body, enlarging the hole to accommodate a fastener and forming hole to allow access to tighten a fastener at the locations marked according to the dimensions provided in a selected one of the patterns of FIGS. 6A, 68, 6C, or 6D

FIG. 10 is a top partial cutaway side view through a front portion of a truck body roof showing a universal evaporator mounting bracket secured to a truck body roof and an evaporator unit secured to the universal evaporator mounting bracket according to one or more embodiments of the present invention.

FIG. 11 is a schematic depiction of one embodiment of a fastener device for mounting system for connecting an evaporator unit to a universal evaporator mourning bracket according to one or more embodiments of the present invention.

FIG. 12 is a schematic depiction of one embodiment of a fastener device for attaching a universal evaporator mounting bracket to a truck body roof according to one or more embodiments of the present invention.

DETAILED DESCRIPTION

Figure 1:
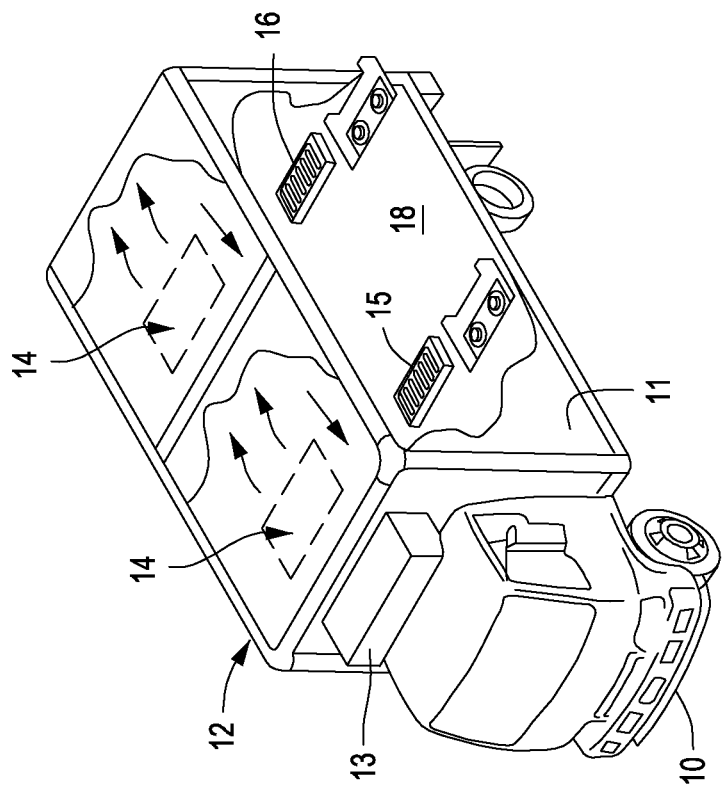
FIG. 1 is a schematic depiction of installation for a prior art evaporator unit for one of several commercially-available refrigeration systems (referred to herein as model AI).
Figure 1:
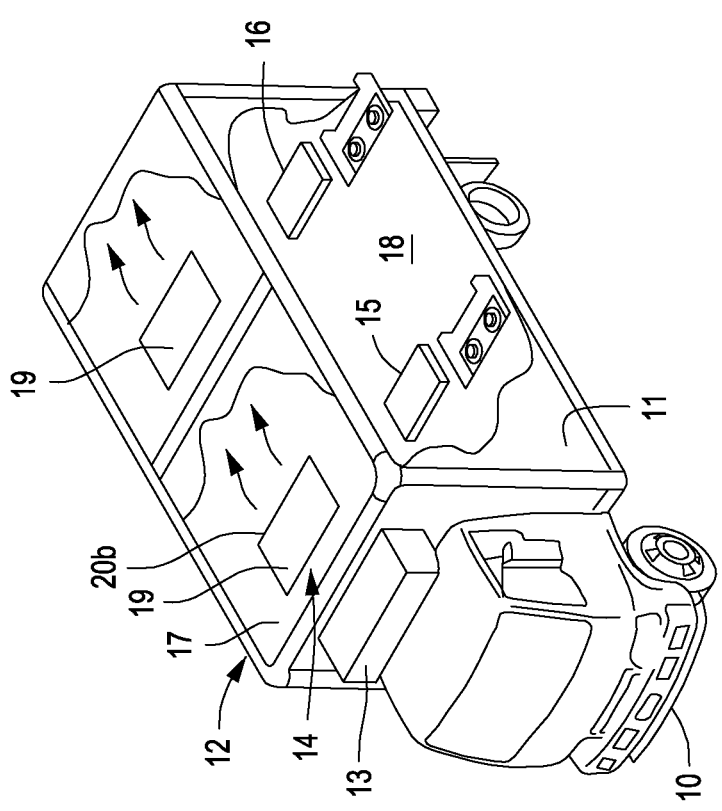

FIG. 1 shows a schematic depiction of installation for a prior art evaporator unit for one of several commercially-available refrigeration systems (referred to for convenience as model AI). A truck 10 with a truck body 11 is depicted with a refrigeration system 12 having a compressor and condenser unit 13 and one or more evaporators 15 and 16 for installation to the truck body roof 17 at an area 14 behind the exterior mounted condenser unit 13 and in the cargo area 18. The preferred manufacturer's installation is to provide a preinstalled mounting plate 19 designed with a provided and appropriately positioned set of mounting studs, specifically positioned, sized and arranged in a particular pattern for mounting the particular evaporator units 15 and 16 of the particular refrigeration system 12.

TABLE I provides written installation instructions and steps for a method of installation of the prior art evaporator unit for the one of several commercially-available refrigeration systems as depicted in FIG. 1. In the prior art example of TABLE I there are installation recommendations, preferred installation method steps 61, 62, and 63 (with pre-installed support plates), and alternative installation method steps 71, 72, 73, 74, 75, 76 and 77 (without pre-installed support plates) for the one of several commercially-available refrigeration systems as depicted in FIG. 1.

Table I

Important Installation Recommendations

IMPORTANT: The interior ceiling of the cargo area must be able to adequately support the weight of the [model AI] evaporators. . . . Additional supports (installer supplied) may be required.
Support Plates
 [The manufacturer of refrigeration unit model AI] recommends securely installing a steel support plate with
  mounting studs (installer supplied) directly to the truck's interior roof structure to safely support the weight of the model AI evaporator prior to insulating and finishing the cargo area. The support place should be correctly located to position the evaporator a minimum of 152 mm (6.00 in.) from the compartment front bulkhead wall. This distance is required to allow access for refrigerant hose and drain hose connections.
Preferred Installation Method
 (With Pre-installed Support Plates)
  IMPORTANT: Be sure to install the correct evaporator in each compartment. The HOST evaporator has drain pan heater wires while the REMOTE evaporator does not.
  61. Remove the plastic cover from the evaporators.
  62. Position the HOST evaporator onto (installer supplied) ceiling mounting studs in the FROZEN COMPARTMENT.
   *Install washers and locking nuts and tighten hardware securely,
  63. Position the REMOTE evaporator onto (installer supplied) ceiling mounting studs in the FROZEN COMPARTMENT.
   *Install washers and locking nuts and tighten hardware securely, NOTE: The covers for both evaporators will be installed later.
Alternative Installation Method
 (Without Pre-installed Support Plates)
  71. Locate and mark the center line (C/L) of the interior compartment ceiling.
  72. Mark a line a minimum of 152 mm (6.00 in,) from the interior bulkhead. NOTE: This distance is required to allow access for refrigerant hose and drain hose connections.
  73. Position each evaporator: up to the ceiling and mark the location of the four mounting holes. NOTE: Be sure the evaporator's air outlet is facing the correct direction for proper airflow.
  74. Drill four 5 mm (0.472 in.) mounting boles into the ceiling and loosely install the supplied 114" lag bolts and washers.
  75. Remove the plastic cover from the evaporators.
  76. Apply RTV silicone adhesive sealant (installer supplied) per the RTV manufacturer's instructions to the top surface area of the evaporator.
  77. Position the evaporator onto the mounting hardware in the ceiling and band tighten bolts securely. NOTE: The evaporator covers will be installed later.

Figure 2:
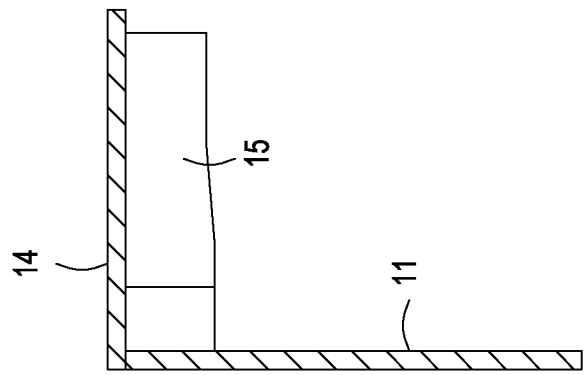
FIG. 2 is a schematic depiction of the dimensions for the prior art evaporator unit and refrigeration system of FIG. 1 and may be associated with the method of installation in TABLE I.
Figure 2:
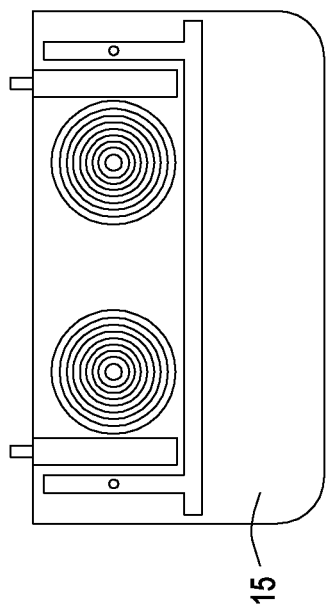
Figure 2:
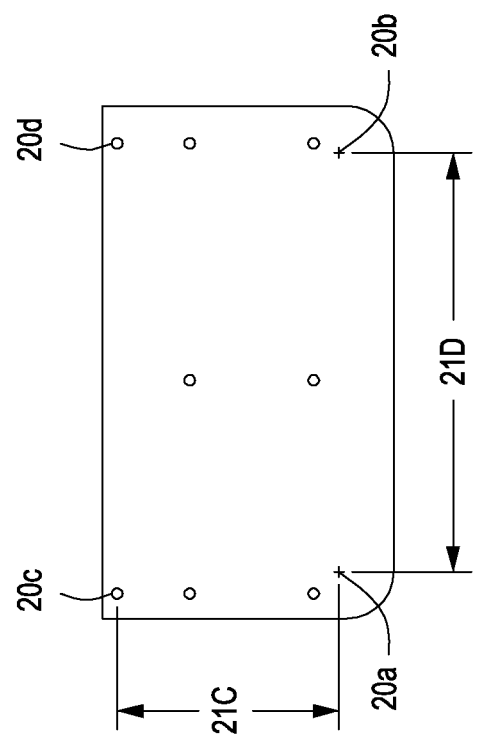

FIG. 2 shows a schematic depiction of size, shape and positioning of a set of mounting holes 20*a*, *b*, *c*, and *d* as defined by the unique dimensions "21C" and "21D" of the particular prior art evaporator unit of FIG, 1, for the pre-installed support plate or for installation particularly requiring forming mounting holes in the roof to the truck body to lit the particular prior art evaporator unit according to the methods of installation indicated in TABLE I.

Figure 3:
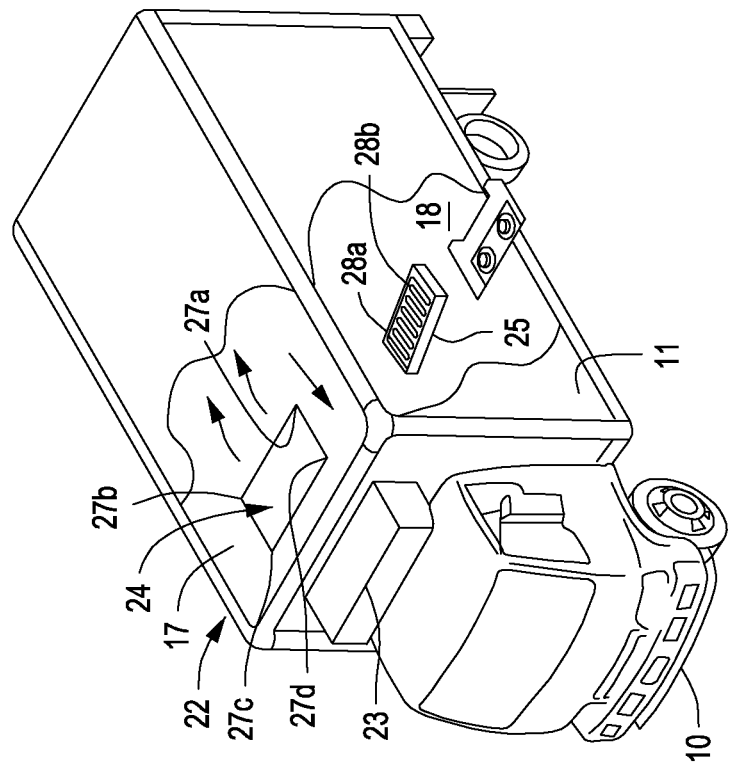
FIG. 3 is a schematic depiction of installation for a prior art evaporator unit for one of several commercially-available refrigeration systems (referred to herein as model AII).
Figure 3:
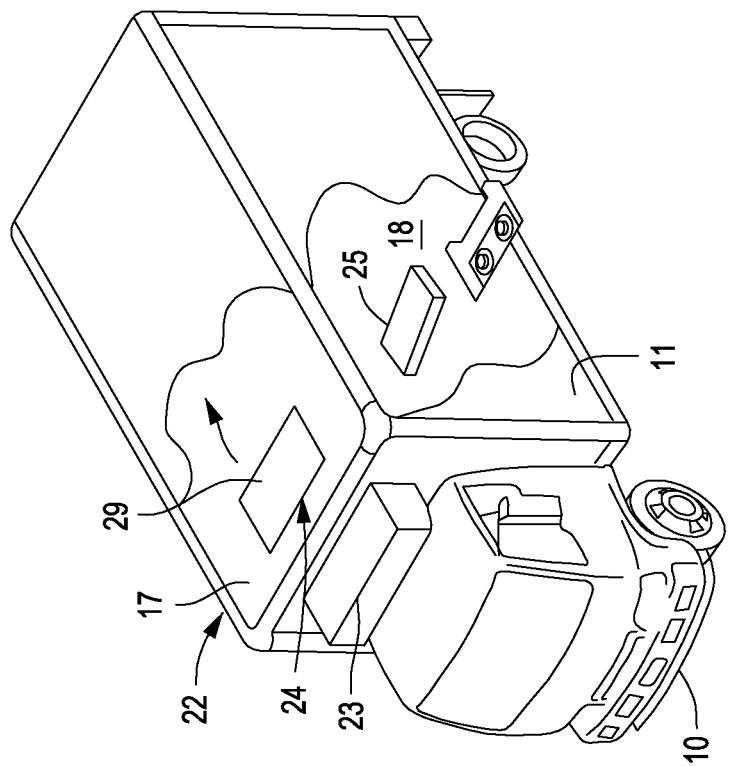

FIG. 3 shows a schematic depiction of installation for a prior art evaporator unit for one of several commercially-available refrigeration systems (referred to for convenience as model AII). A truck 10 with a truck body 11 is depicted with a refrigeration system 22 having a compressor and condenser unit 23 and one or more evaporators 25 for installation to the truck body roof 17 at a mounting area 24 behind the exterior mounted condenser unit 23 and in the cargo area 18. The preferred manufacturer's installation is to provide a pre-installed mounting plate 29 designed with a provided and appropriately positioned set of mounting studs, specifically positioned, sized and arranged in a particular pattern for mounting the particular evaporator unit 25 of the particular refrigeration system 22. In the alternative method the one or more evaporators 25 are mounted by marking and drilling mounting holes 27*a*, *b*, *c*, and *d* at the appropriate mounting area 24 corresponding to the size, shape and location of corresponding holes as defined for the particular evaporator 25.

TABLE II provides written installation instructions and steps for the method of installation of the prior art evaporator unit for the one of several commercially-available refrigeration systems as depicted in FIG. 3. In the prior art example of TABLE II there are installation recommendations, preferred installation method steps 81, 82, and 83 (with pre-installed support plates), and alternative installation method steps 91, 92, 93, 94, 95, 96, 97 and 98 (without pre-installed support plates) for the one of several commercially-available refrigeration systems 22 as depicted in FIG. 3.

TABLE II

Installation—[Model AII]Evaporator Single Temperature Systems

Important Installation Recommendations

IMPORTANT: The interior ceiling of the cargo area must be able to adequately support the weight of the model AII evaporator. . . . Additional supports (installer supplied) may be required. Support Plates [The manufacturer of model AII] recommends securely installing a steel support plate with mounting studs (installer supplied) directly to the truck's interior roof structure to safely support the weight of the model AII evaporator prior to insulating and finishing the cargo area The support plate should be correctly located to position the evaporator a minimum of 152 mm (6.00 in.) from the compartment front bulkhead wall. This distance is required to allow access for refrigerant hose and drain hose connections.
Preferred Installation Method (with Pre-installed Support Plates):
81. Remove the plastic cover from the evaporator.
82. HEAT OPTION ONLY—Position the accumulator assembly at the rear of the evaporator * Connect the ⅞" tube to the mating tube inside the evaporator. * Secure the accumulator to the rear of the evaporator with supplied hardware and tighten securely. 83. Position the evaporator onto installer supplied) mounting studs. * install ·washers and locking nuts and tighten hardware securely. NOTE: The evaporator cover will be installed later. Alternative Installation Method (without pre-installed support plates)
91. Remove the plastic cover from the evaporator.
92. HEAT OPTION ONLY —Position the accumulator assembly at the rear of the evaporator: Connect the ⅞" tube to the mating tube inside the evaporator. Secure the accumulator to the rear of the evaporator with supplied hardware.
93. Locate and mark the center line (C/L) of the interior compartment ceiling.
94. Mark a line a minimum of 152 mm (6.00 in.) from the interior bulkhead. NOTE: This distance is required to allow access for refrigerant hose and drain hose connections.
95. Position the evaporator up to the ceiling .and mark the location of the four mounting holes. NOTE: Be sure the evaporator's air outlet is; facing the correct direction for proper airflow.
96. Drill four 5 mm (0.472 in.) mounting boles into the ceiling and loosely install the supplied ¼" lag bolts and washers.
97. Apply RTV silicone adhesive sealant (installer supplied) per the RTV manufacturer's instructions to the top surface area of the evaporator.
98. Position the evaporator onto the mounting hardware in the ceiling and hand tighten bolts securely. NOTE: The evaporator cover will be installed later.

Figure 4:
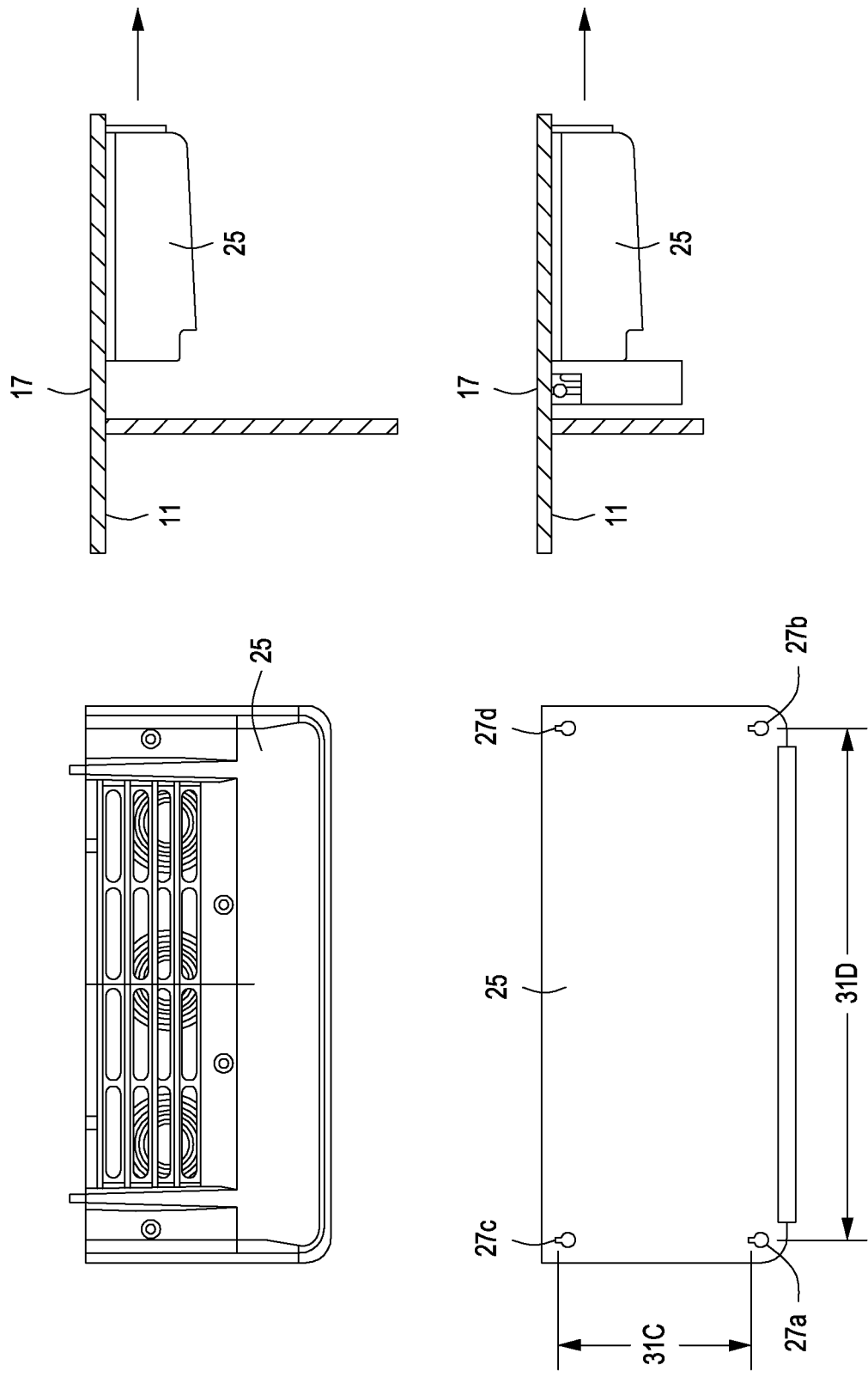
FIG. 4 is a schematic depiction of the dimensions for the prior art evaporator unit and refrigeration system of FIG. 3 and may be associated with the method of installation in TABLE II.

FIG. 4 shows a schematic depiction of the unique dimensions "31C" and "31D" of the particular prior art evaporator unit 25 of FIG. 3, for the pre-installed support plate 29 or for installation requiring particularly forming mounting holes 27a, b, c and d in the roof 17 of the truck body 11 to fit the particular prior art evaporator unit 25 according to the methods of installation indicated in TABLE II.

Figure 5:
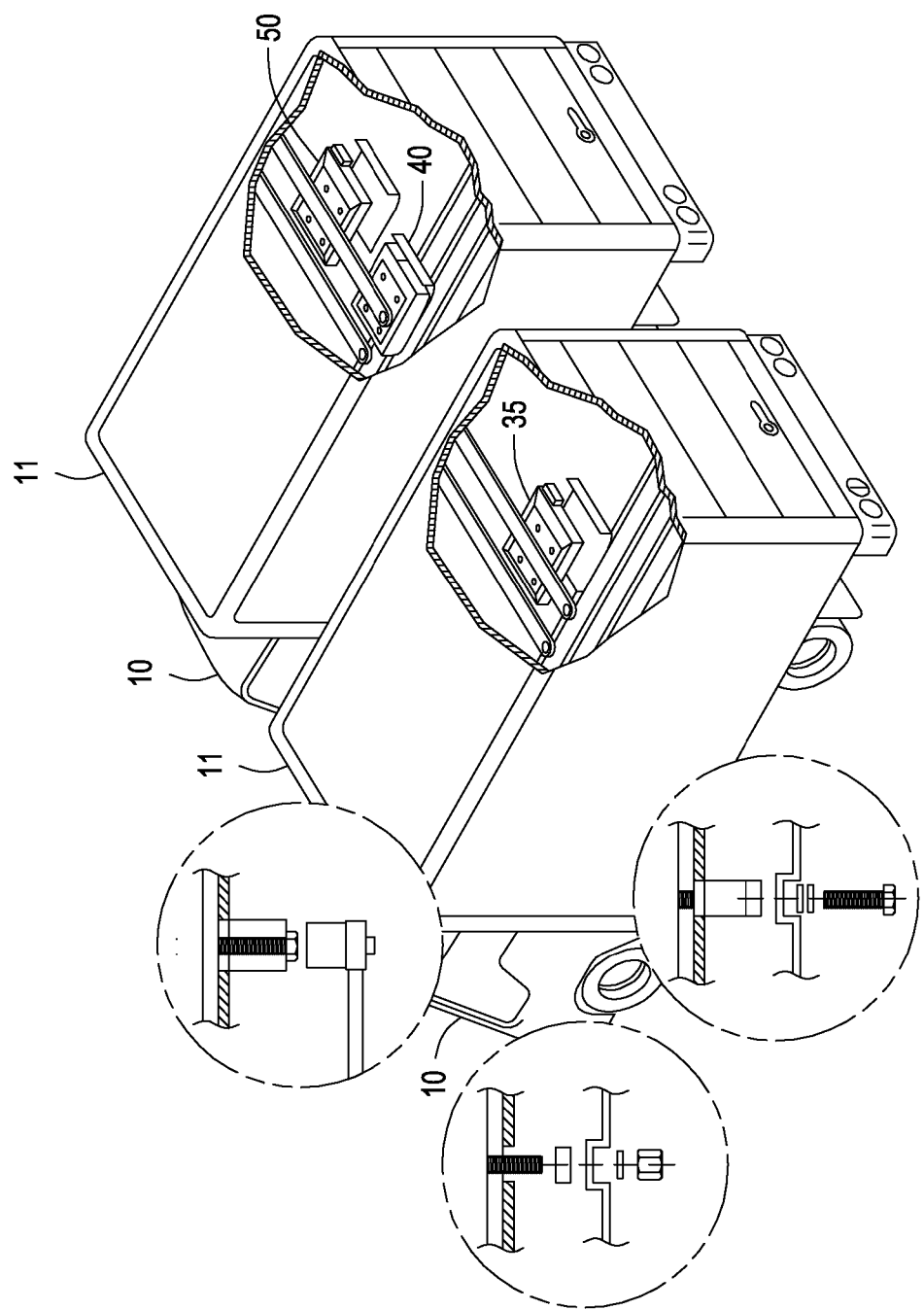
FIG. 5 is a schematic depiction of installation for a prior art evaporator units for several other commercially-available refrigeration systems (referred to herein as models BIII/BIV and BV), two of which systems, model nos. BIII and BIV, have evaporator units with the same mounting dimensions

FIG. 5 is a schematic depiction of installation for a prior art evaporator units for several commercially-available refrigeration systems (referred to for convenience as models BIII & BIV and BV). It may be understood that while a plurality of models are schematically indicated in FIG. 5 as examples, a typical configuration with multiple evaporator units in a single refrigerated truck body will likely provide all of the same types of evaporator units in the single truck body.

FIGS. 6A, 6B, 6C, and 6D provide the particular dimensions for mounting prior art evaporator units 35, 40 and 50 for the one or more of the several commercially-available refrigeration systems models BM & BIV and By, as depicted generally in FIG. 5. A portion of written installation instructions and steps for the method of installation of the prior art evaporator units generally applicable for the one or more of the several commercially-available refrigeration systems of FIG. 5 and with specific mounting dimensions in FIGS. 6A, 6B, 6C, and 6D has been provided by the manufacturer as follows: "Remove evaporator access panels. If the box has mounting studs, fasten the evaporator using supplied hardware; otherwise, mark the mounting holes as indicated above (depending on unit model). Leave a minimum of 6" (150 mm) between the box wall and the rear of the evaporator."

Figure 7A:
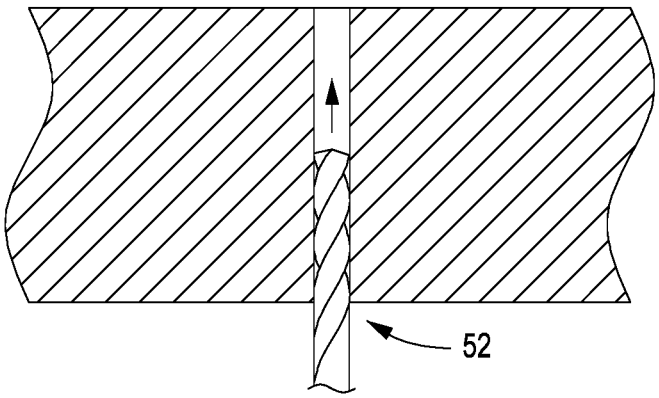
Figure 7B:
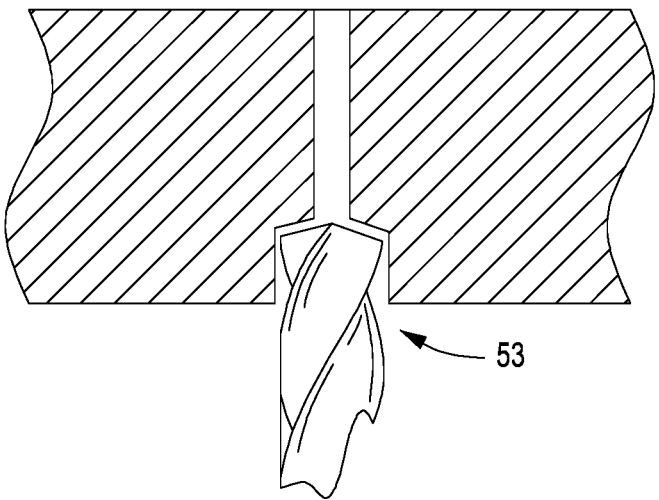
Figure 7C:
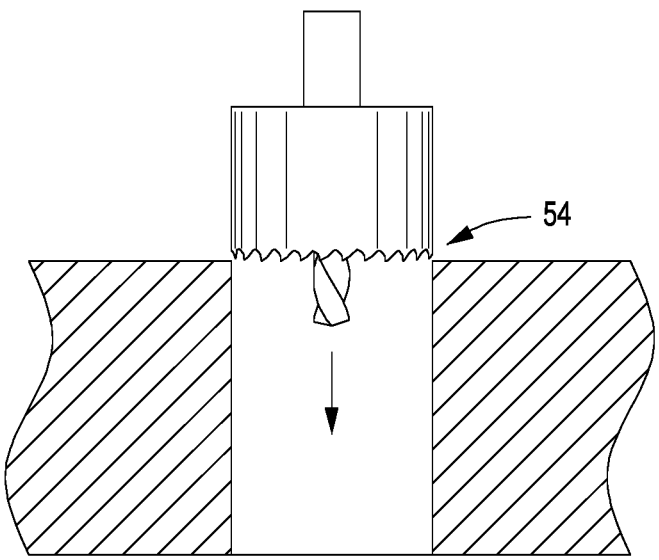

Steps of the prior art mounting method instructions are further provided by the manufacturer as depicted in FIGS. 7A, 7B, and 7C.

According to the installation method step schematically in FIG. 7A the instructions indicate as follows: "From the inside of the box, drill 4 holes completely through the roof of the vehicle using a ⁷⁄₃₂" (5 mm) drill bit."

According to the installation method step schematically in FIG. 7B the instructions indicate as follows: "From the inside of the box, step drill only through the inside skin of the vehicle using a ½" (12.5 mm) drill bit."

According to the installation method step schematically in FIG. 7C the instructions indicate as follows: "From the outside of the box, use a ⅞" (22 mm) hole saw to drill the outer roof of the box and the insulating foam CAUTION: Make certain NOT to drill all the way through the roof. The ½" (12.5 mm) hole in the inside skin of the vehicle must remain intact."

According to the prior art installation steps as indicated above, existing mounting studs from a prior installation (if properly positioned) may be used. Alternatively, in an original installation or new model of evaporator unit installation, mounting holes are to be marked according the schematic depiction of mounting hole dimensions indicated in FIG. 6C as the dimension 36C and 36D for either mounting evaporator units for systems models BIII & BIV. For mounting the evaporator unit for BV systems mounting holes are to be marked with mounting dimensions indicated in FIG. 6D as dimensions 51C and 51D.

Following the marking of the mounting hole positions, that are each different depending upon the model of the refrigeration unit, FIGS. 7A, 7B, and 7C taken together provide additional installation method steps. Step 52 of FIG. 7A for drilling through the roof, step 53 of FIG. 7B for forming a fastener hole at the locations marked according to the dimensions provided in FIGS. 6C and 6D, and step 54 of FIG. 7B for forming an access opening for securing a fastener.

Thus, it has been discovered by the applicants there is a variation in mounting dimensions for different commercially-available refrigeration units. Installation of such varied evaporator units according to the prior art often requires particularly different arrangements, spacing and location of mounting holes for different types of commercially-available evaporator units for truck body refrigeration systems. Such different refrigeration systems having differently sized and configured evaporator units with differently dimensioned mounting hole positions.

Figure 8:
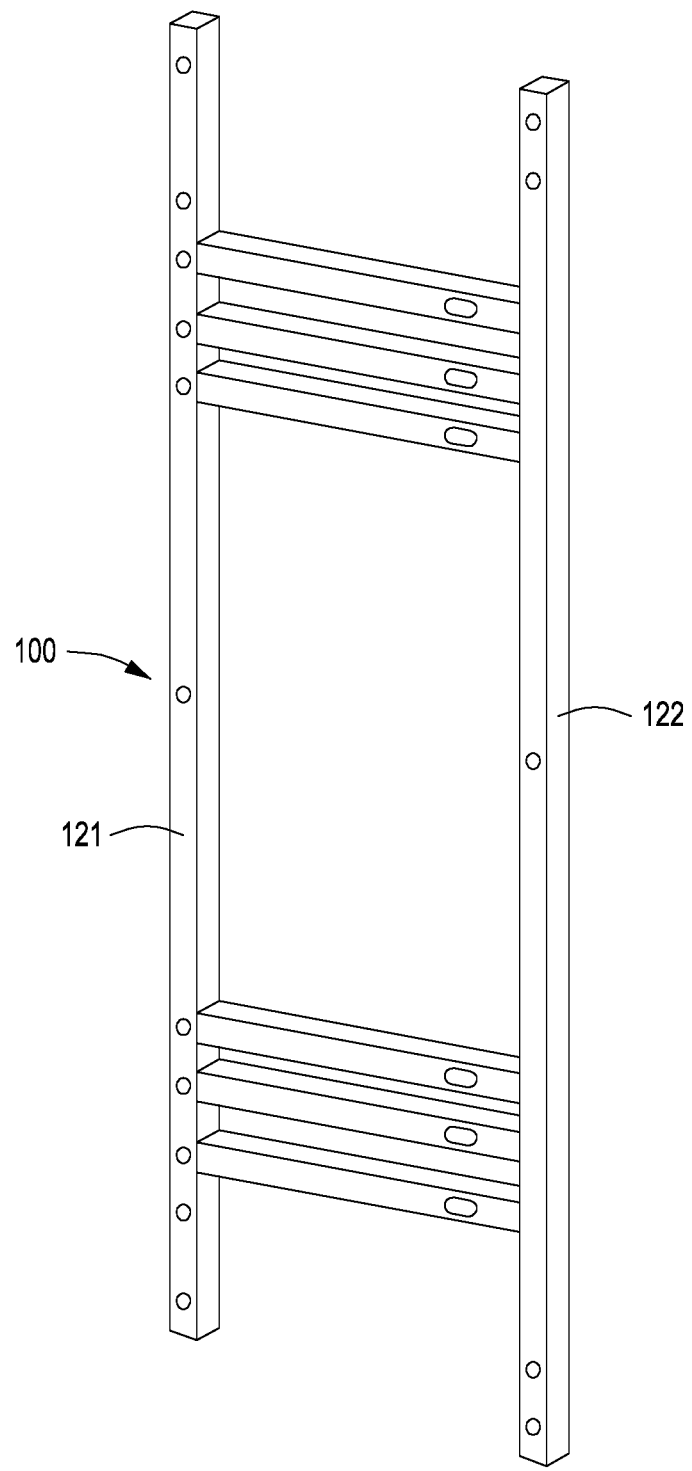
FIG. 8 is a perspective view of a universal mounting bracket according to one or more embodiments of the present invention.

FIG. 8 shows a perspective view of a universal mounting bracket 100 according to one or more embodiments of the present invention.

According to one or more embodiments, the present invention is useful to provide a universal mounting bracket 100 in one or more embodiments configured so that one or more universal mounting bracket can be used to mount a plurality of different evaporator units without re-configuring and without re-forming the mounting holes for each different commercially-available model of refrigeration unit. The novel universal mounting bracket is also useful to permit engagement with appropriately positioned structural reinforcing support in a truck body. The reinforcement structure is positioned the same for supporting the universal mounting bracket connected to any of the plurality of different evaporator units that may be connected to the universal mounting bracket.

Figure 9:
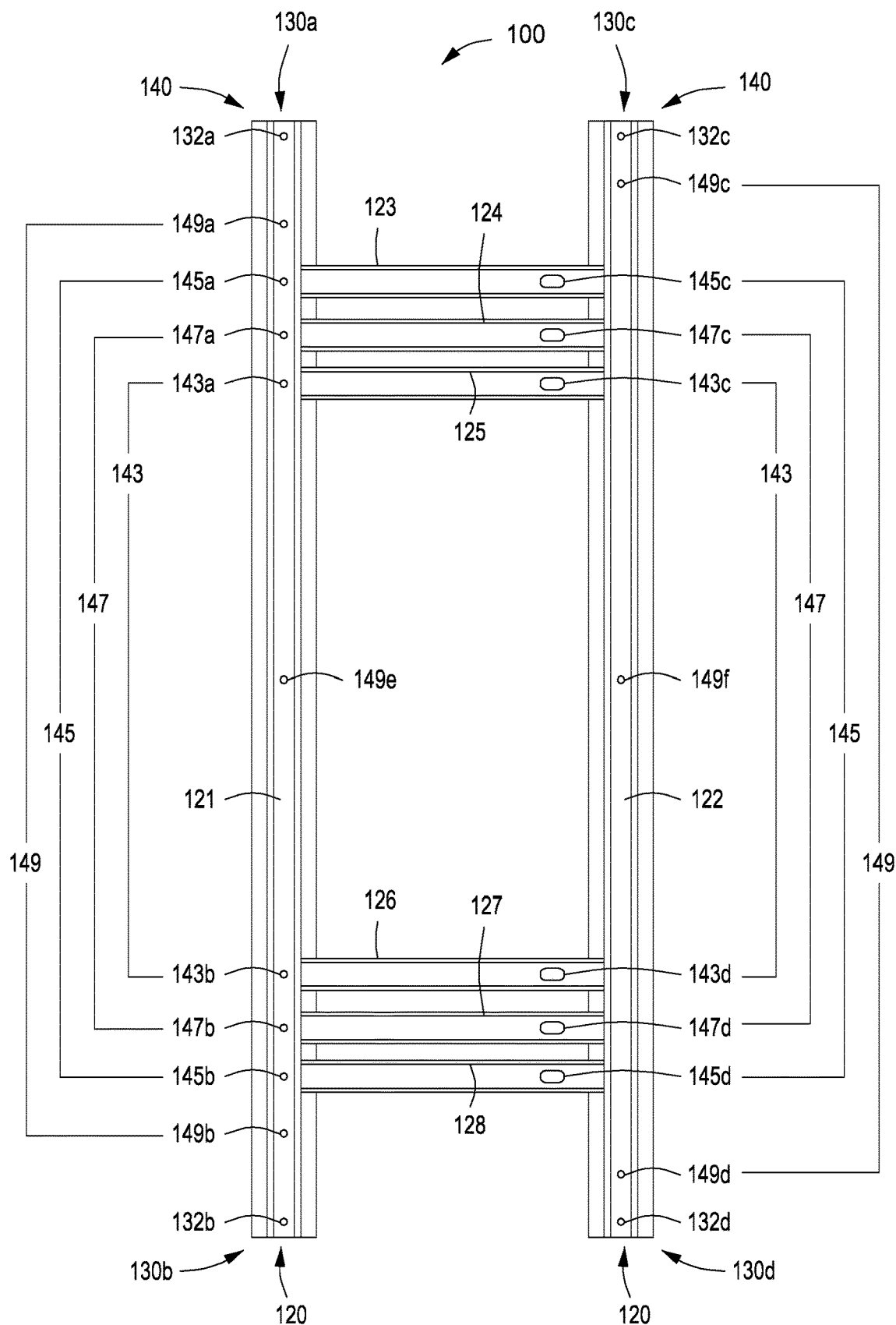
FIG. 9 is a bottom plan view of a universal mounting bracket showing relative dimensions and patterns for selected sets of evaporator mounting location holes for several different available evaporator units according to one or more embodiments of the present invention.

According to one or more embodiments, using the evaporator mounting bracket 100 and system, as depicted in FIGS. 8 and 9, allow an installer to utilize a single design and shape for a universal mounting bracket 100 that includes multiple options for the evaporators that may be mounted and supported by built-in roof reinforcements when installing a refrigeration unit in a truck body or trailer. The disclosed universal evaporator mounting bracket 100 provides standardization of the mounting of any of a plurality of evaporator units to a common mounting bracket that interfaces with the roof reinforcements. This standardization for the installation by the installer also permits the user of the refrigerated truck body with flexibility to subsequently install a different refrigeration system if needs change over time, such as changes in cooling capacity, pricing or availability of commercially refrigeration systems.

According to one or more embodiments of the universal mounting bracket 100 and system, the added flexibility as to which refrigeration units may be mounted also gives truck dealers the ability to stock one or more truck bodies with the universal mounting bracket and system installed. Upon receiving an order from a customer for a particular commercially available refrigeration unit or one with particular desired features or capabilities, the dealer may take the truck body from stock and install any of a number of available refrigeration systems as desired by customers and to meet the needs of such different customers. This may be done efficiently and without having to wait for a custom made truck body to be manufactured for particular customer purposes, customer needs or customer preferences. The dealer can provide the options to the customer and fulfill them without requiring a special custom order for the truck body as is currently required to provide the truck body with appropriate structure and mounting brackets for the particular refrigeration system option chosen by the customer.

In one or more embodiments, with reference to FIGS. 8 through 19A and 19B, and in conjunction with the description provided herein, one or more embodiments of the invention may be understood. A universal mounting system for an evaporator unit of a refrigeration system in a truck body provides for mounting any one of a selected number of currently available evaporator units.

In one or more embodiments, the universal mounting system comprises a universal mounting bracket 100 with a construction as described herein, With reference to an embodiment depicted in FIG. 9, the universal mounting bracket 100 includes a pair of spaced-apart, truck mounting brace members 121 and 122. A plurality of cross members 123, 124, 125, 126, 127 and 128, according to an embodiment depicted in FIG. 9, are rigidly secured between the mounting brace member 121 and 122. A set of brace-to-truck body attachment devices 132*a,* 132*b,* 132*b,* and 132*d,* such as fasteners or holes for receiving fasteners, are formed at predetermined brace attachment locations on the mounting, bracket brace members. The attachment locations are predetermined corresponding to truck body attachment positions at which reinforcement structure is located in or on the truck body. Thus, the plurality of brace attachment devices, such as sets of fasteners or holes for receiving fasteners depicted generally as connection devices are formed at the truck body attachment positions corresponding to the predetermined attachment locations on the brace members of the universal mounting bracket for attachment of the universal mounting bracket to the truck body. A plurality of selected sets of evaporator connection devices, such as fasteners or holes for fasteners depicted generally as evaporator connection devices sets 143, 145, 147 and 149, each including the sets of fasteners or holes for receiving fasteners 143*a-c,* 145*a-d,* 147*a-d,* 149*a-d,* are formed on one or more of the brace members and/or on one or more of the cross members, wherein each one of the plurality of sets of evaporator connection devices is formed at a corresponding one of a plurality of different sets of evaporator mounting positions defined by at least one of a plurality of different a connection arrangements, each evaporator connection arrangement corresponding to one of a plurality of different commercially-available evaporator units for refrigerated truck body refrigeration systems.

For example, each connection arrangement of evaporator unit fastening devices may be formed in a pattern of fastener devices or fastener holes established for a particular commercially-available evaporator unit according to the size, shape, design, construction or other factors considered by the manufacturers of the available evaporator units. For example, a rectangular pattern of connections holes may be provided at the corners of a commercially-available evaporator unit and thereby define the pattern and the positions of all of the connection holes or devices for the particular evaporator unit. The universal evaporator mounting bracket is provided with fastening devices or holes arranged in a plurality of such patterns, each pattern to match a different one or more of a plurality of available evaporator units. For example, a set of connection holes in a rectangular pattern of connection holes, with a connection hole located at each of four corners to define the connection positions and pattern for connection of the universal mounting device to a particular evaporator. A different sizes and shapes of rectangular patterns or another shape patterns will define the position of the sets of holes for other available evaporator units.

FIG. 9 shows a bottom plan view of a universal mounting bracket 100 according to one or more embodiments. The universal mounting bracket 100 comprises a pair 120 of brace members 121 and 122. A plurality of cross members 123, 124, 125, 126, 127, and 128 are rigidly secured between the pair of braces 121 and 122 The braces are provide with attachment devices 130a, 130b, 130c, and 130d, such as holes through which fasteners may be fastened, at predetermined attachment locations 132a, 132b, 132c, and 132d. The same universal mounting bracket attachment locations 132a, 132b, 132c, and 132d may be used for any of the plurality of evaporator units to be mounted. As will be explained with reference to FIGS. 13-19A &19B, the attachment locations may usefully correspond to truck body reinforcement positions 232a, 232b, 232c, and 232d (not shown in FIG. 9, see FIG. 13).

According to one or more embodiments of the present invention, the selected sets 143, 145, 147 and 149 of evaporator connection devices, such as holes, are formed at different connection locations for different available evaporator units (for example commercially-available evaporator units 15, 25, 35, 40 and 50 of FIGS. 1&2, FIGS. 3&4, and FIGS. 5 & 6A-6D). Thus, the universal mounting bracket uniquely provides for mounting any of a plurality of selected evaporator units 15, 25, 35, 40 and 50, to single configuration universal mounting bracket 100. A plurality arrangements or patterns of connection devices generally referred to by reference numeral 140, such as connection holes for accommodating fasteners, are provided at a plurality of predetermined sets of connection locations 143, 145, 147 and 149 on one or more of the brace members 121 and 122 and/or on the cross members 123, 124, 125, 126, 127, and 128. The sets of connection locations 143, 145, 147 and 149 correspond to the size, shape and dimensions of the connection positions for the commercially-available evaporator units for which the universal mounting bracket is designed.

Figure 6A:
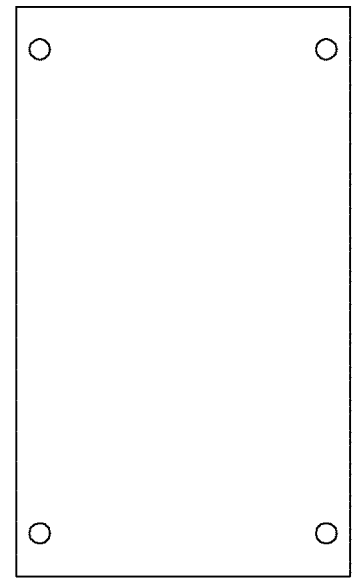
Figure 6C:
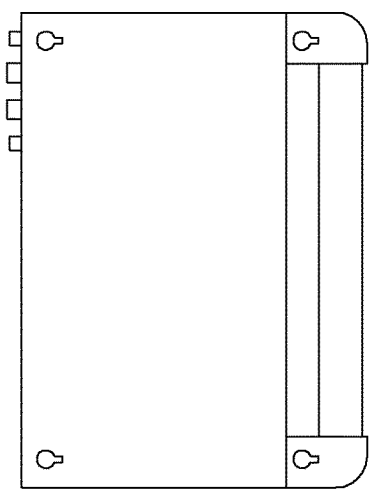
Figure 6B:
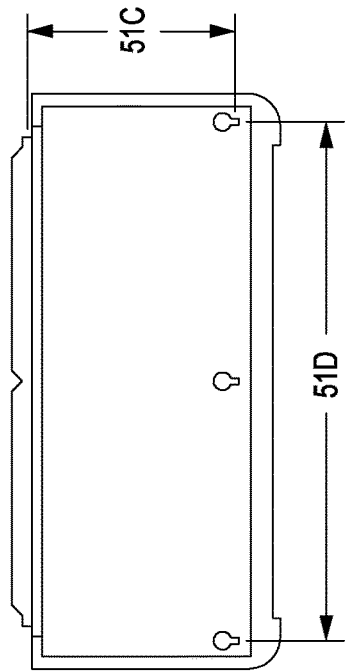
Figure 6D:
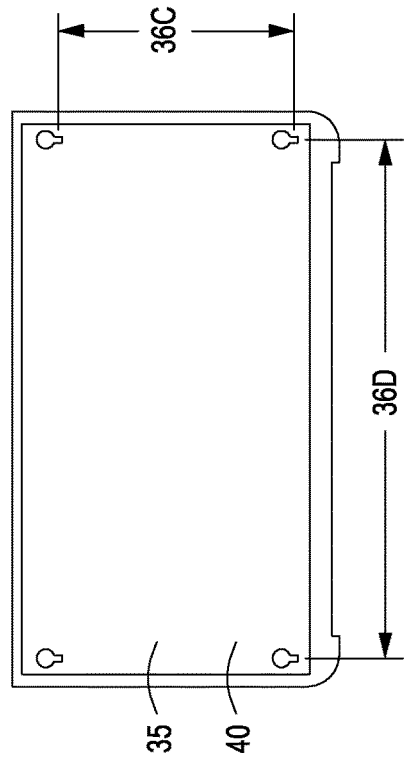

In the embodiment depicted in FIG. 9 the individual connection locations of the sets 143, 145, 147 and 149 of connections devices at different connection locations. The connections devices for the commercially-available model indicated in FIGS. 1&2 are indicated by reference numbers 143a, 143b, 143c and 143d. The connections devices for the commercially-available model indicated in FIGS. 3&4 are indicated by reference numbers by reference numbers 145a, 145b, 145c and 145d. The connections devices for the commercially-available model indicated in FIGS. 5&6C are indicated by reference numbers 147a, 147b, 147c and 147d. The connections devices for the commercially-available model indicated in FIGS. 5&6D are indicated by reference numbers 149a, 149b, 149c and 149d.

FIG. 10 shows a partial cutaway side view through a top front portion of a truck body roof showing a universal evaporator mounting bracket 100 secured to a truck body 110 at the roof 160 and an evaporator unit 150 is connected to the universal evaporator mounting bracket which is attached to the truck body 110 at roof 160 according to one or more embodiments of the present invention.

The novel universal evaporator mounting bracket 100 utilizes a variety of mounting points (see FIG. 9) to interface with the selected most commonly used two-piece refrigeration systems for truck bodies and trailers. A two-piece refrigeration system typically has the condenser (one piece) located on the exterior of the truck body, such as on the front of a truck body, and an evaporator unit (another piece) located on the interior of the truck body, such as on the roof of the cargo area of the truck body.

FIG. 11 shows a schematic depiction of one embodiment of a connection device 132 for connecting an evaporator unit referred to generally as 150 (although it will be understood based upon this disclosure that evaporator unit 150 could be any of a number of selected commercially available evaporator units as discussed herein) to a universal evaporator mounting bracket 100 according to one or more embodiments of the present invention. In this embodiment the connection device may include a bolt 152, a washer 153, a connection portion 154 of the mounting bracket, one or more reinforcing washers 155 and 156 and a nut 152, all aligned along axis 151 with a fastener device represented generally the fastener and receiving hole 132.

According to the inventive installation method, the universal evaporator mounting bracket 100 is designed to be connected to virtually any make and model evaporator unit selected from the available commercial refrigeration systems. Once the evaporator unit 150 is connected to the universal mounting bracket 100, the combined bracket and evaporator unit is then lifted and attached, such as by using fasteners, to the truck body 110 corresponding generally to a truck body as in FIGS. 1, 3 and 5. In the embodiment depicted in FIG. 10 the universal bracket 100 is attached to the roof 160 of the truck body 110, at the predetermined attachment positions.

FIG. 12 shows a schematic depiction of an alternative one embodiment of an attachment device for attaching a universal evaporator mounting bracket to a truck body roof 160 in which a threaded stud 162 is provided at the attachment locations for the attachment devices 140 in the universal mounting bracket 100 according to one or more embodiments of the present invention.

According to one or more embodiments the attachment positions correspond to reinforcement positions at which truck body reinforcement structure is located in advance of the evaporator installation. The reinforcement structure may be better understood with reference to FIGS. 13-16. Usefully, the reinforcement structure is formed in or on the roof at reinforcement positions at the roof inside of the cargo area of the truck body. Mounting the evaporator unit on the roof inside the cargo area provides cooling circulation down over the cargo without interfering with floor area and side space that may define the carrying capacity. According to one or more embodiments of the invention the concept of a universal mounting bracket usefully allows the truck body roof to be reinforced at the proper locations for mounting to the universal evaporator mounting bracket. This usefully provides sufficient strength in the truck body roof to support any of the commercially-available evaporator units for which sets of evaporator mounting holes are provided.

Figure 13:
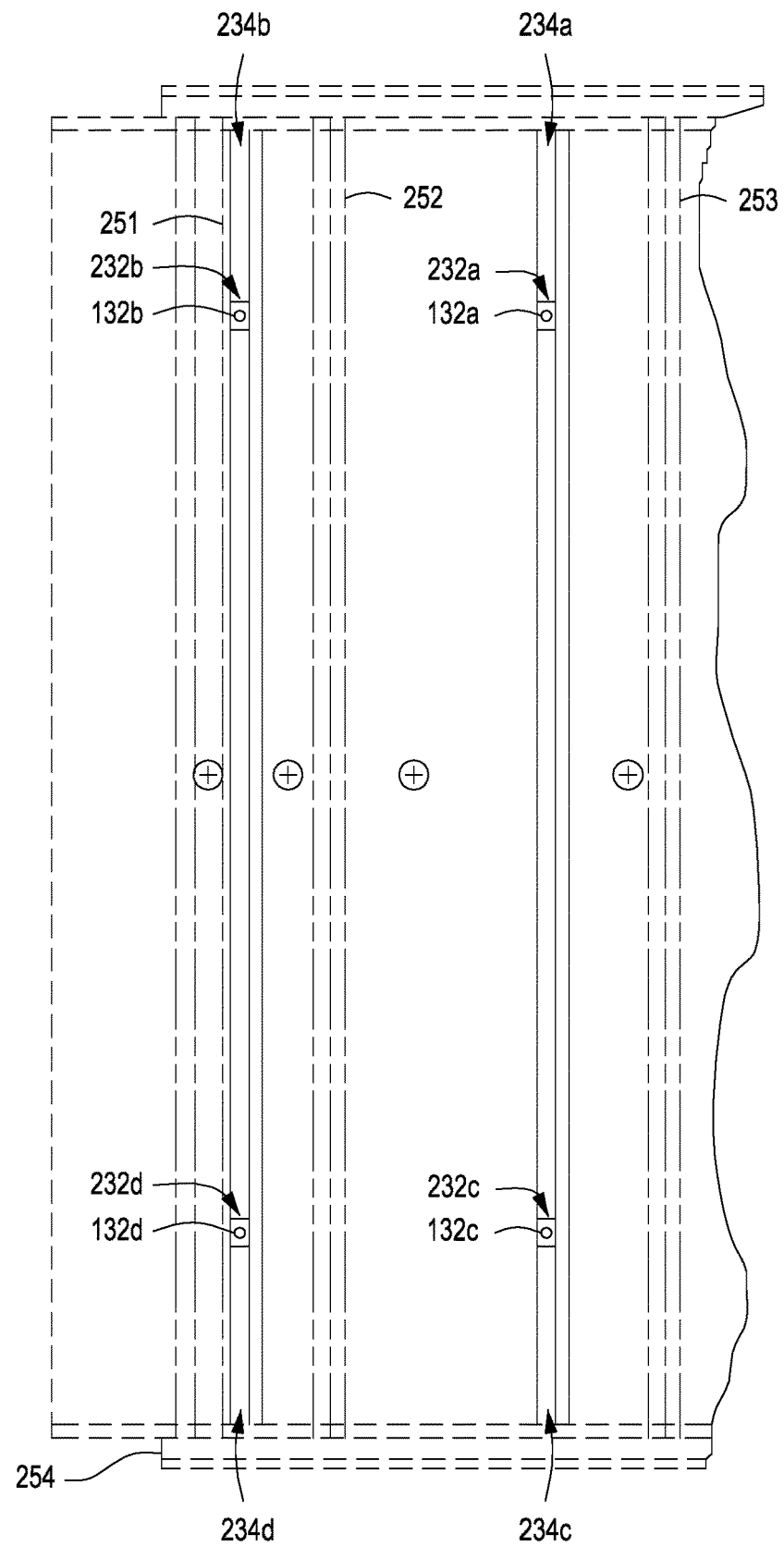
FIG. 13 is a partial cutaway top view through a front portion of a truck body roof showing reinforcement structure for a mounting system for a universal evaporator mounting bracket according to one or more embodiments of the present invention.

FIG. 13 shows a partial cutaway top view through a front portion of a truck body roof showing reinforcement structure for a mounting system for a universal evaporator mounting bracket according to one or more embodiments of the present invention.

Figure 14:
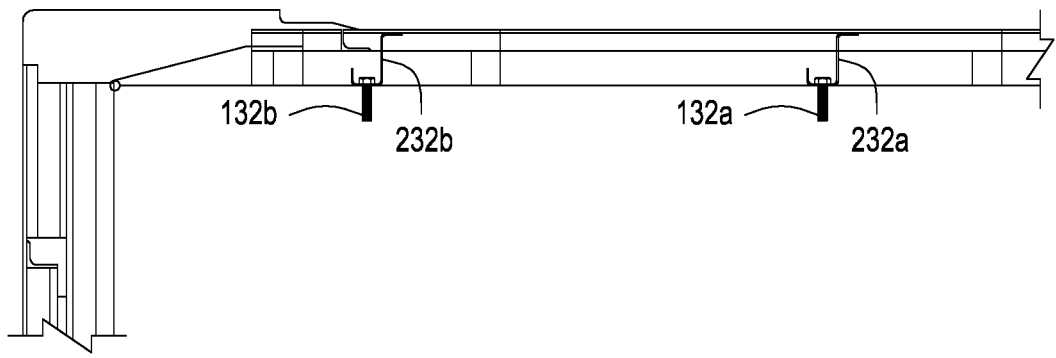
FIG. 14 is a partial side cross-section view along a lateral centerline through a front portion of a truck body roof showing reinforcement structure for a mounting system for a universal evaporator mounting bracket according to one or more embodiments of the present invention.

FIG. 14 shows a partial side section view through a front portion of a truck body 110 roof 160 showing reinforcement structure 232 for a mounting system for a universal evaporator mounting bracket according to one or more embodiments of the present invention.

Figure 15:
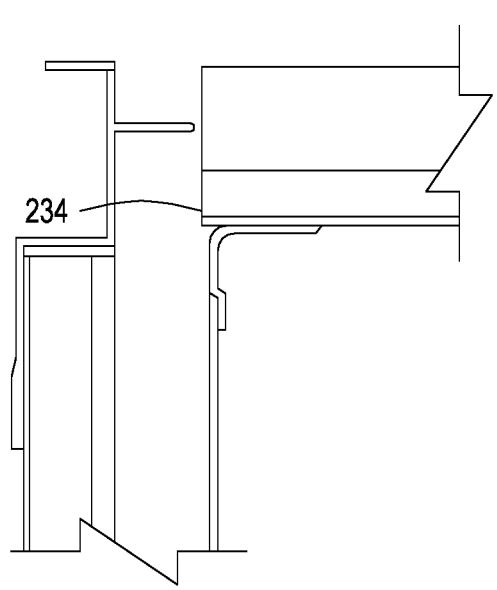
FIG. 15 is a partial side section view of the truck body roof of FIG. 14, at 90°, showing reinforcement structure for a mounting system for a universal evaporator mounting bracket according to one or more embodiments of the present invention.

FIG. 15 shows a partial side section view at 90°, through a portion of the truck body roof 160 of FIG. 14 showing reinforcement structure 134 for a mounting system for a universal evaporator mounting bracket according to one or more embodiments of the present invention.

Figure 16:
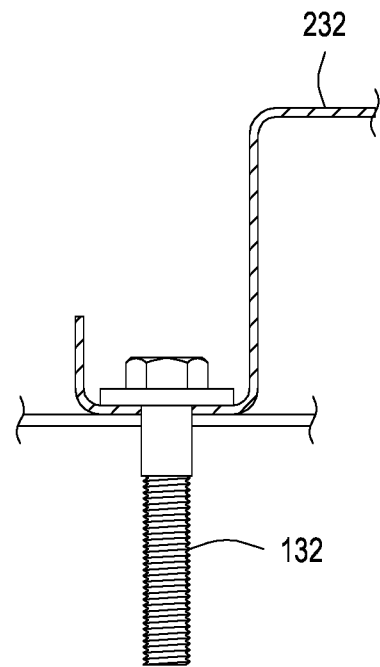
FIG. 16 is a partial side section view of an attachment device and support structure for the truck body roof of FIG. 14 showing reinforcement structure and attachment device for a mounting system for a universal evaporator mounting bracket according to one or more embodiments of the present invention.

FIG. 16 shows a partial side section view through the reinforcing structure 232 of FIG. 14 showing reinforcement structure and fastening device for a mounting system for a universal evaporator mounting bracket according to one or more embodiments of the present invention.

One or more embodiment of the inventive universal evaporator mounting bracket 100 can be made from a variety of materials based on the truck owner's needs and requirements. The construction of the universal evaporator mounting bracket 100 according to one or more embodiments may be understood with reference to FIGS. 17, 18, 19A and 19B. For example, metal material such as aluminum or steel may be used to form the universal bracket 100. The side braces members 120 and cross brace 123, 124, 125, 126, 127 and 128 may also be made of such metal materials which may usefully provide sufficient strength and durability for the mounting bracket to secure the evaporator unit to the truck body. Metal material may also be useful to allow both a low profile construction and manufacturing using cost-effective techniques, such as forming brace members by cutting lengths of extruded or rolled metal channels, welding the cross brace members to the mounting brace members, and drilling holes for fasteners at the various sets of predetermined mounting locations, without significant weakening of the mounting bracket structure by the hole drilling.

Figure 17:
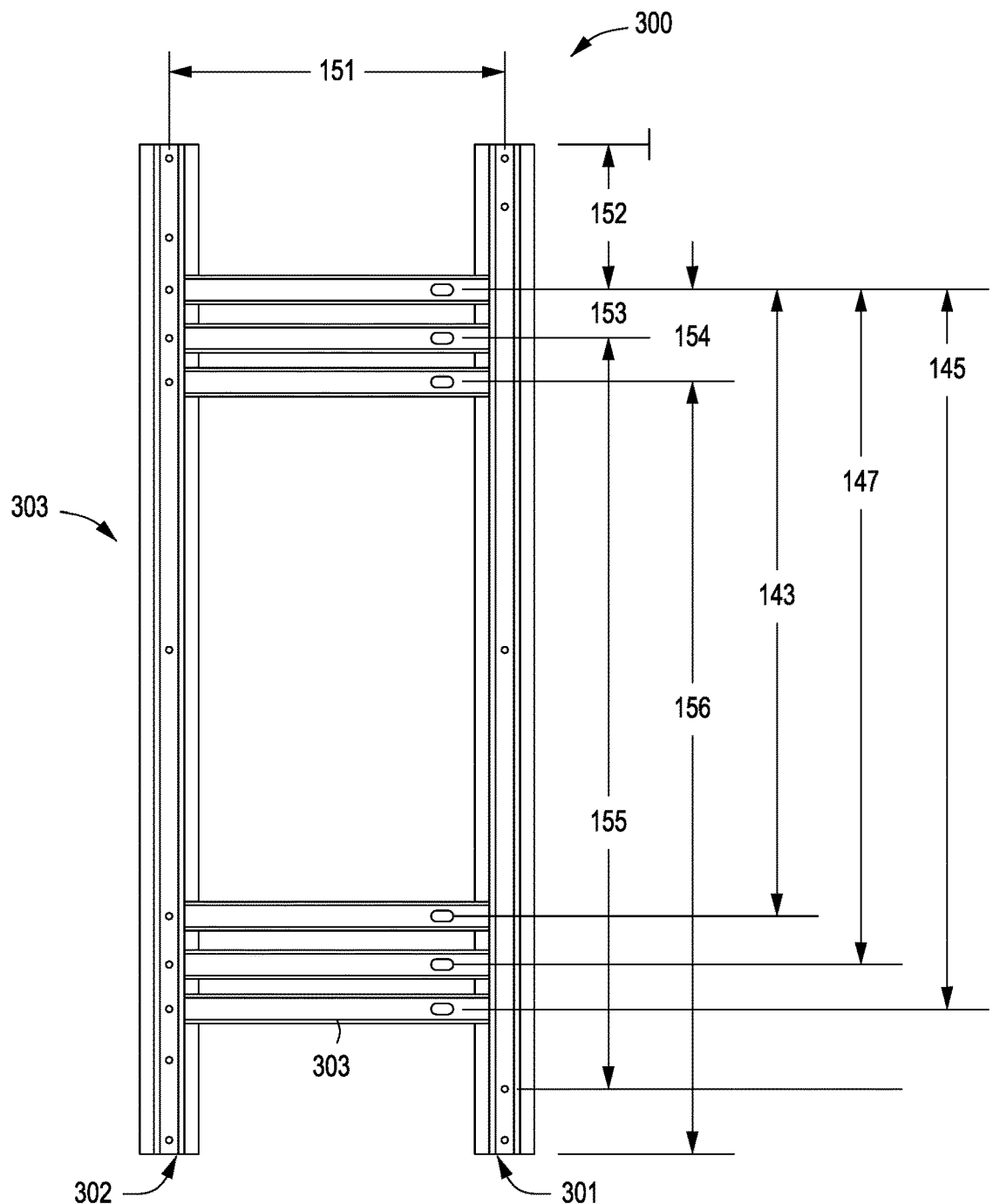
FIG. 17 is a partially dimensioned bottom plan view of a universal mounting bracket according to one or more embodiments of the present invention.

FIG. 17 shows a partially dimensioned bottom plan view of a universal mounting bracket according to one or more embodiments of the present invention.

Figure 18:
FIG. 18 is an end view of the embodiment of the universal mounting bracket of FIG. 17 according to one or more embodiments of the present invention.

FIG. 18 shows an end section view of a universal mounting bracket according to one or more embodiments of the present invention.

Figure 19A:
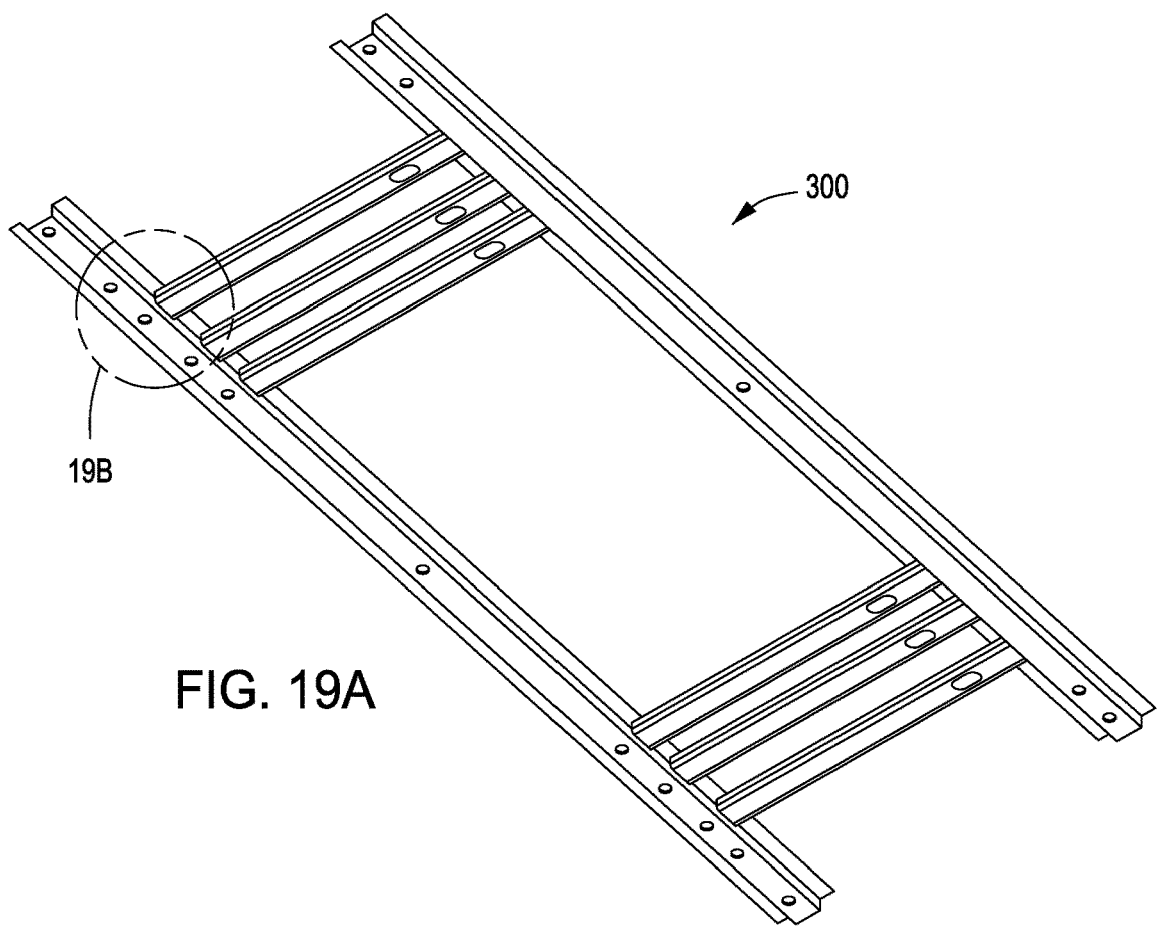
FIG. 19A is a perspective view of a universal mounting bracket according to one or more embodiments of the present invention.

FIG. 19A shows a perspective view of a universal mounting bracket according to one or more embodiments of the present invention.

Figure 19B:
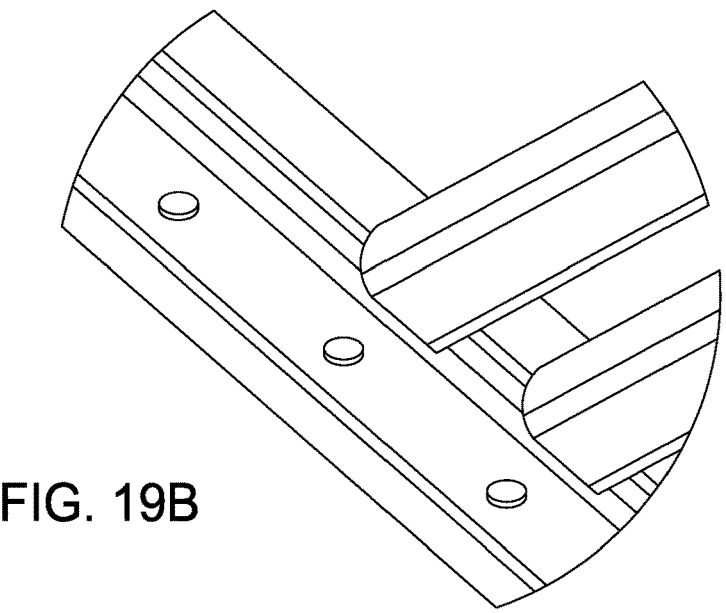
FIG. 19B is an enlarge detail view depicting construction of cross members welded to a brace member according to one or more embodiment of the present invention.

FIG. 19B shows an enlarge detail view depicting construction of a cross member welded to a brace member according to one or more embodiment of the present invention.

While the invention has been described with respect to a limited number of embodiments, those skilled in the art, having benefit of this disclosure, will appreciate that other embodiments can be devised which do not depart from the scope of the invention disclosed herein. Accordingly, the scope of the invention should be limited only by the attached claims.

What is claimed is:

1. A universal mounting bracket for an evaporator unit of a refrigeration system in a truck body, the universal mounting bracket comprising:
   a pair of spaced apart brace members;
   a set of bracket-to-truck body attachment devices, wherein the bracket-to truck body attachment devices are located at predetermined attachment locations on the pair of spaced apart brace members;
   a plurality of cross members rigidly secured between the brace members, the plurality of cross members including;
      a first pair of cross members at a first distance apart and having a first pair of evaporator connection devices,
      a second pair of cross members at a second distance apart and having a second pair of evaporator connection devices,
      a third pair of cross members at a third distance apart and having a third pair of evaporator connection devices,
   wherein the first distance is greater than the second distance, and the second distance is greater than the third distance;
   the first, second, and third pairs of evaporator connection devices, are at a plurality of locations on the cross members corresponding to first, second, and third connection positions defined by different commercially-available refrigeration system evaporator units.

2. The universal mounting bracket of claim 1, comprising:
   reinforcement structures at positions in the truck body corresponding to the predetermined locations on the pair of spaced apart brace members of the universal mounting bracket for supporting the universal mounting bracket attached to the truck body; and
   wherein the attachment devices engage the reinforcement structures to attach the universal mounting bracket to the truck body.

3. The universal mounting bracket of claim 2, wherein the reinforcement structure at positions in the truck body are at position in a roof of the truck body and the attachment devices engage the reinforcement structure to attach the universal mounting bracket to the roof of the truck body.

4. A universal mounting system for mounting a refrigeration unit evaporator to a roof of a truck body, the universal mounting system comprising:
   a universal mounting bracket including a pair of spaced-apart brace members;
   reinforcement structures at predetermined positions in the roof of the truck body;
   a set of brace-to-truck body attachment devices formed at predetermined bracket-attachment locations on the brace members, wherein the predetermined bracket-attachment locations correspond to the one or more predetermined positions of the reinforcement structures in the roof of the truck body, so that the set of brace-to-truck body attachment devices engage with and are supported by the reinforcement structures;
   a plurality of cross members rigidly secured between the brace members, the plurality of cross members including:
      a first pair of cross members at a first distance apart and having a first pair of evaporator connection devices,
      a second pair of cross members at a second distance apart and having a second pair of evaporator connection devices,
      a third pair of cross members at a third distance apart and having a third pair of evaporator connection devices, and
      wherein the first distance is greater than the second distance, and the second distance is greater than the third distance; and
   the first, second, and third pairs of evaporator connection devices are at predetermined connections locations on the first, second, and third cross members, wherein the predetermined connection locations of each pair of evaporator connections devices are defined by one of a plurality of different sets of a connection positions corresponding to one of a plurality of different commercially-available evaporator units for refrigerated truck body refrigeration systems.

5. The universal mounting system for mounting a refrigeration unit evaporator to a roof of a truck body of claim 4, wherein:
   the set of brace-to-truck body attachment devices formed at predetermined bracket-attachment locations on the spaced-apart brace members comprise attachment holes formed through the spaced-apart brace members by which fasteners are engageable through the attachment holes; and the plurality of sets of evaporator connection devices at predetermined connections locations on one or more of the spaced-apart brace members and the cross members comprise connection holes formed through the spaced-apart brace members and the cross members by which fasteners are engageable through the connection holes.

6. A universal mounting bracket for attachment of an evaporator unit of a refrigeration system to a truck body, the universal mounting bracket comprising:

a pair of spaced apart brace members having a set of bracket-to-truck body attachment devices, wherein the bracket-to truck body attachment devices are located at predeteimined attachment locations on the pair of spaced apart brace members;

a first pair of cross members at a first distance apart and having a first pair of evaporator connection devices;

a second pair of cross members at a second distance apart and having a second pair of evaporator connection devices;

a third pair of cross members at a third distance apart and having a third pair of evaporator connection devices; and wherein the first distance is greater than the second distance, and the second distance is greater than the third distance, such that the each of the first second and third connection devices have different connection locations for mounting to different evaporator units with correspondingly different connection locations.

7. The universal mounting bracket of claim 6, further comprising:

a set of truck roof reinforcement structurers coupled to the bracket-to truck body attachment devices at the predetermined attachment locations.

* * * * *